United States Patent [19]

Nakane et al.

[11] Patent Number: 5,374,972
[45] Date of Patent: Dec. 20, 1994

[54] PHOTOGRAPHIC PROCESSING SYSTEM

[75] Inventors: Nobu Nakane; Yutaka Ohsone; Tetsuya Kurimoto; Toshihiko Watanabe, all of Hino, Japan

[73] Assignee: Konica Corporation, Japan

[21] Appl. No.: 73,752

[22] Filed: Jun. 8, 1993

[30] Foreign Application Priority Data

Jun. 11, 1992 [JP] Japan .................. 4-152223
Jun. 12, 1992 [JP] Japan .................. 4-153737
Jun. 16, 1992 [JP] Japan .................. 4-156837

[51] Int. Cl.$^5$ ............................................ G03D 3/08
[52] U.S. Cl. ................................................. 354/319
[58] Field of Search ...................... 354/318-323; 355/27; 134/64 P, 64 R, 122 P, 122 R; 271/9, 3, 13, 298

[56] References Cited

U.S. PATENT DOCUMENTS 4,126,391 11/1978 Nishimoto ............................ 354/322
4,324,480 4/1982 Nomura et al. ...................... 354/320
4,705,376 11/1987 Shaub et al. ......................... 354/298

Primary Examiner—D. Rutledge
Attorney, Agent, or Firm—Jordan B. Bierman

[57] ABSTRACT

An apparatus for processing a photographic paper, includes a distributor between an exposure station and a developing station so that plural sheets of photographic papers exposed at the exposure station can be conveyed in parallel in the developing station.

9 Claims, 4 Drawing Sheets

PHOTOGRAPHIC PROCESSING SYSTEM

BACKGROUND OF THE INVENTION

The present invention relates to a photographic processing system in which photographic papers each subjected respectively to photographic printing exposure are distributed to a line or a plurality of lines and conveyed to a developing device so as to effectively carry out photographic processing.

When an image on a negative photographic film is exposed and printed on a photographic paper and the photographic paper is developed so as to provide a photographic print, there are two methods. One method is described as follows: a plurality of image frames are printed on a long size photographic paper; the images are developed; and then the plurality of image frames are individually cut off and discharged outside the apparatus. The other method is described as follows: a photographic paper is cut off to a print size; an image is exposed and printed on each photographic paper; and then each photographic paper is subjected to development processing. The former method is advantageous in the case where a large number of image frames of one size are continuously processed, however, when the operation is interrupted, a large amount of photographic paper is wasted which has been provided between the printing exposure section and the development processing section. Moreover, this method is not suitable when photographic papers of various sizes are processed. On the other hand, in the latter method, after a photographic paper has been pulled out from an accommodating section, it is cut into each printing size, and each photographic paper is independently exposed and developed. Therefore, all photographic paper on the process can be effectively utilized, and further this method is suitable when photographic papers of various sizes are processed. The present invention relates to the aforementioned latter method. More particularly, the present invention relates to improvements in photographic processing in which photographic papers that have been cut and exposed are effectively developed.

A printing-exposure operation is completed in several seconds or several tens of seconds. On the other hand, a developing processing operation requires several minutes. Consequently, when photographic papers are continuously processed, the feed speed of a printing device is high, and that of an automatic developing device is low. For that reason, the processing speed of the entire apparatus is determined by the processing speed of the automatic developing device. Accordingly, in order to improve the efficiency, the processing speed of the automatic developing device has been increased. Since development processing is carried out using chemical reactions, an increase of processing speed is limited. Therefore, it is required to increase the processing speed of the entire apparatus without increasing the developing speed.

The first object of the present invention is to break through the limitations of the conventional technique and to provide a system in which a series of printing and developing processing is quickly conducted.

However, as color photography has become popular and the demand for color photographic prints is increasing, predetermined sizes (service size, L-size and others) of prints are processed at high speed. Development has been conducted in order to quickly supply customers with color prints, that is, development has been conducted to realize what is called "simultaneous printing". On the other hand, the use of photography has been diversified, and the demand for a large size photographic print, which has been used only by professional photographers, has been increased. The sensitivity of photographic films has been improved, fine-grain photography has been achieved, and the photographic ability of cameras has been improved. Therefore, it has become possible for amateur photographers to use large size enlarged prints. In order to meet the demand for large size enlarged prints, printing and automatic developing devices are prepared which have a wide photographic paper passage to process large size prints.

Since the space in a laboratory is limited and it is necessary to increase the rate of operation of the apparatus in the laboratory, it should be avoided to provide an automatic developing device for photographic papers having a wide photographic paper passage in addition to a conventional automatic developing device having a narrow photographic paper passage. Accordingly, a small size of photographic paper is also processed by the automatic developing device having a wide photographic paper passage. However, when small size photographic papers are processed by the large size automatic developing device one by one, the efficiency is low. In order to solve the aforementioned problem, the following conventional measure has been taken: an automatic developing device is installed in a dark room; small size photographic papers that have already been exposed are conveyed into the dark room; and the photographic papers are manually arranged in the photographic paper passage of the developing device in such a manner that the entire width of the arranged photographic papers coincides with the width of the photographic paper passage of the developing device. The aforementioned manual operation can be practically carried out, however, the efficiency is not necessarily high.

The second object of the present invention is to solve the aforementioned problems and to provide a photographic distribution device by which a plurality of lines of small size photographic papers are conveyed into an automatic developing device for large size photographic papers.

Moreover, the present invention is related to a photographic material processing device provided with a conveyance means that conveys exposed, cut, sheet-shaped photographic papers to a sorter after development, wherein the sorter sorts the photographic papers for each order.

For convenience of handling, the length of a photographic film is restricted so that the outer diameter of the film magazine is made to be small. Accordingly, the number of frames is limited. In the case of a common 35 mm photographic film, the longest film is provided with 36 frames.

Recently, color photography has become popular, and there is an increasing demand for color photographic films and papers. For the convenience of users, service properties of color photographic films and papers have been improved, and the following laboratory system has been developed: When an exposed photographic film provided in a film magazine is set in an apparatus, the film is completely automatically developed, and the developed film inserted into a film case is discharged from the apparatus, and at the same time, the prints packed in a bag are also discharged from the apparatus.

There are two main types of this convenient photographic processing system. One is a mini-laboratory system. According to the mini-laboratory system, in accordance with the orders of individual customers, a relatively small amount of prints are handily processed in a shop. In this case, developing and printing operations are intermittently conducted for each order. Therefore, it is not necessary to provide a particular control system. However, in this case, it is difficult to reduce the service cost.

The other is a large-scale laboratory system. In this system, the aforementioned complete automatic operation is realized, and a large amount of photographic films and papers are processed at high speed, so that the service cost can be reduced.

Important points in the large-scale laboratory system described above are how quickly and stably prints of high quality can be supplied without employing skilled workers. That is, to meet the demand of customers without making any errors and to complete an automatic system in which all operations from charging of films to packing of prints can be quickly carried out.

In the large-scale laboratory system, operations are carried out in the following manner:

After a photographic film has been exposed, the film accommodated in a film magazine is set in the apparatus. Then, the tongue of the film is pulled out from the film magazine. After that, a leader, which is a guide sheet for improving the conveyance properties of the film, is connected with the tip of the film, and the film is sent into a film automatic developing device so that the film is subjected to development processing. The rear end of the film is disconnected from the film magazine. The empty film magazine is discharged from the apparatus separately from the film. After the developing process, the film is dried, and then a plurality of films are connected with a splice tape so that a long film can be formed. Then the long film is supplied to a printing device. At this time, for the purpose of controlling the film according to its customer order, the order information is attached to the splice portion of the film. Separately, the order information is recorded by a recording means such as a magnetic tape in accordance with the connection of the long film. When the finished prints are distributed, this order information is effectively used.

When a large amount of orders are processed by the automatic photographic processing apparatus described above, the entire processing capacity is determined by the automatic developing device for photographic papers because its processing capacity is relatively low. For example, the processing time of an automatic developing device for photographic papers is several times longer than that of a printing device. Therefore, it is required to improve the processing capacity of the automatic developing device for photographic papers.

The third object of the present invention is to provide a photographic processing system in response to the needs, in which the capacity of the automatic developing device for photographic papers is improved, and the finished prints are quickly distributed and arranged in a required order.

SUMMARY OF THE INVENTION

In order to accomplish the first object, the photographic processing system of the present invention includes a distributing means capable of distributing a plurality of lines of photographic prints perpendicular to the photographic paper inserting direction of the automatic developing device, wherein the distributing means is provided between a printing device to conduct print exposure processing on a photographic paper that has been cut to a predetermined size and an automatic developing device to develop the exposed photographic paper.

The photographic processing system of the present invention includes: a distributing means capable of distributing a plurality of lines of photographic prints perpendicular to the photographic paper inserting direction of the automatic developing device, wherein the distributing means is provided between a printing device to conduct print exposure processing on a photographic paper that has been cut to a predetermined size and an automatic developing device to develop the exposed photographic paper; and an alignment means to align the leading edge portions of the plurality of distributed photographic papers in the direction perpendicular to the inserting direction of the automatic developing device for photographic papers, thereby the plurality of photographic papers are inserted into the developing device in an aligned condition.

In this invention, photographic papers are cut to a predetermined size before they are processed by the printing device. The reason why this type of printing device is adopted is as follows: after exposure, a plurality of photographic papers are aligned and simultaneously inserted into the automatic developing device, so that the processing capacity of the automatic developing device can be increased by the number of lines of the aligned photographic papers. As shown in the description of the prior art, a print-exposure operation is completed in several to several tens of seconds, however, a developing operation requires several minutes.

Therefore, in a period of time corresponding to the difference, the exposed photographic papers can be stocked and distributed and arranged into a plurality of lines, and they are simultaneously inserted into the automatic developing device. Therefore, in the present invention, consideration is given to this point, and a calculation processing means judges how many exposed photographic papers can be arranged in the processing width of the automatic developing device, and the photographic papers are distributed according to the result of judgment, and then the distributed photographic papers are inserted into the automatic developing device. In this case, after the photographic papers have been distributed, they are simultaneously inserted into the automatic developing device. The reason is that the photographic papers can be conveniently accumulated and sorted after development. Therefore, the present invention is not necessarily limited to the operation in which the photographic papers are simultaneously inserted into the automatic developing device, however, the present invention is limited to the distributing operation.

Therefore, after the photographic papers have been distributed, they may be successively inserted into the automatic developing device from the positions where the photographic papers have been distributed.

In the present invention, the photographic paper processing width of the automatic developing device is set at a large value. The reason is that large-sized prints of high magnification can be automatically processed by the developing device, so that the service properties can be improved and photographic papers of various sizes can be processed. Moreover, with respect to the photographic papers of small size, they are distributed in the range of the photographic paper processing width of the developing device, and a plurality of lines of photographic papers are simultaneously sent into the automatic developing device, so that the developing efficiency can be improved.

The photographic distribution device to accomplish the second object of the present invention is composed in the following manner: the photographic distribution device is light-tightly connected with the photographic paper discharge section of the printing device so that the exposed cut-sheet-shaped photographic papers are accommodated in the distribution device; the photographic papers are distributed to a plurality of lines; and the distributed photographic papers are simultaneously or successively sent into the automatic developing device. The photographic paper distribution device of the present invention includes a control means that judges the distribution amount by the print size so as to determine the number of distribution lines.

Moreover, the photographic distribution device of the present invention is composed in the following manner: the photographic distribution device is connected with the photographic paper discharge section of the printing device so that the exposed, cut-sheet-shaped photographic papers are accommodated in the distribution device; the photographic papers are distributed to a plurality of lines; and the distributed photographic papers are simultaneously or successively sent into the automatic developing device, and the photographic paper distribution device of the present invention includes a control means that judges the distribution manner by the print size so as to determine the number of distribution lines, and to move positions of the distribution lines over the entire width of the photographic paper conveyance rollers of the automatic developing device so that the conveyance line can be successively changed.

The reason why the photographic distribution device is light-tightly connected with the photographic paper discharge section of the printing device is as follows: the printing device is used in a bright room, and images are exposed and printed on cut-sheet-shaped photographic papers, right after that the photographic papers are distributed and processed by the automatic developing device, so that the deterioration of latent images can be prevented, and the amount of work conducted in a dark room can be reduced. When the photographic distribution device is light-tightly connected with the automatic developing device, all processes from printing to development can be completely executed in a bright room. However, in the present invention, the distribution and the developing devices are not necessarily connected light-tightly. The reason is described as follows: when an automatic developing device for large-sized photographic papers is applied to this invention while it is disposed in a dark room so as to be used for various purposes, if a discharge opening of the distribution device connected with a printing device disposed in a bright room is made to through a light shielding wall of a dark room, the distributed papers can be inserted into the automatic developing device disposed in the dark room. In the present invention, the number of lines of distribution is determined in accordance with the size of the print to be distributed so that the adjoining photographic papers do not overlap when they pass through the automatic developing device, the passage width of which is predetermined.

In this connection, the print size is determined so that the photographic paper width can be most effectively used for printing. The print size is determined by the width and the cutting length of the photographic paper. Accordingly, the width of the photographic paper provided in the printing device contributes to the calculation of distribution. Therefore, the photographic paper width may be sent to the control means so that the number of lines of distribution can be calculated. Alternatively, an input means may be used so that the size of the photographic paper is inputted into the means, and then the information is sent to the control means so as to calculate the number of lines of distribution.

Next, when the number of lines of distribution is not more than the number of lines calculated by the control means, the entire processing width of the automatic developing device is not used. In other words, there is always an empty line in the aforementioned distribution. Therefore, lines of photographic papers of any size can be distributed on both sides of the passage of the automatic developing device. Consequently, when the conveyance line of the photographic papers is successively changed from one side of the passage of the automatic developing device to the other side in the present invention, a specific portion or a specific conveyance line of the automatic developing device can be prevented from being stained, so that the occurrence of staining on prints can be avoided.

In order to accomplish the third object, the present invention is to provide a photographic material processing apparatus in which a single line of exposed, cut, sheet-shaped photographic papers or a plurality of lines of exposed cut-sheet-shaped photographic papers are developed, dried and discharged by an automatic developing device, wherein the photographic material processing apparatus includes a print conveyance means by which the discharged prints are conveyed successively or all at once and accumulated in a sorter, being classified for each order.

Since a single line of cut-sheet-shaped photographic papers or a plurality of lines of cut-sheet-shaped photographic papers are developed, dried and discharged by the automatic developing device, the low processing capacity of the automatic developing device can be improved. For that reason, a multi-line of small-sized photographic papers are processed by the automatic developing device having a wide processing width. In this case, the width of a tray to receive the printed photographic papers is larger than the maximum processing width of the automatic developing device. A print pushing member penetrating through this tray is protruded from the tray surface, and the discharged prints are received on the tray. Then, the sides of the prints are pushed in the width direction of the tray, and the prints are dropped onto a receiver of the sorter provided in the pushing direction.

Next, the print pushing members are arranged so that they can come into contact with the side edge of each line of photographic papers. The number of lines of the photographic papers varies according to the print size, so that a plurality of print pushing members are arranged. Since the print pushing members respectively push each line of photographic papers, they are provided in such a manner that one print pushing member is arranged on the outermost side, and others are arranged between the prints.

The print pushing members are constituted and controlled by a control means in the following manner: the print pushing members are engaged with a conveyance means and are reciprocated or circulated in a direction perpendicular to the advancing direction of the prints discharged from the automatic developing device; the stopping positions of the print pushing members are selected in accordance with the number of lines of the photographic prints; and an interval between the print pushing members is varied. Consequently, the prints discharged onto the tray by the automatic developing device are received and accumulated on the sorter in order by the pushing members. In this connection, when the photographic papers are distributed into a plurality of lines in the upstream of the automatic developing device after a printing-exposure operation has been completed, the photographic papers are distributed in accordance with the order of the pushing operation conducted by the print pushing members, so that the prints dropped on the sorter are accumulated in the predetermined order.

Selection of the stopping position of the print pushing member can be reset for each order. The reason is as follows: when a large number of orders are continuously processed, order information must be controlled so that the operation can be carried out in accordance with the change of the print size. When the same print size is processed, the stopping position is not changed, and only the conveyance means is moved, and the sorter receiving tray is controlled so that it can be moved in accordance with the completion of each order. When the aforementioned control is carried out, the prints accumulated on the receiving tray of the sorter are conveyed to the next process, and the empty receiving tray is disposed in front of the print pushing member waiting for the operation of the next order.

As described above, a collated set of prints of one order are accumulated on the receiving tray of the sorter, and moved on the sorter. Therefore, the set of prints of one order can be easily handled for a customer, and the prints can be picked up anywhere when they are conveyed on the sorter. Accordingly, the workability can be improved.

DETAILED DESCRIPTION OF THE PREFERRED EMBODIMENTS

With reference to the attached drawings, an example of the present invention will be specifically explained as follows.

Figure 1:
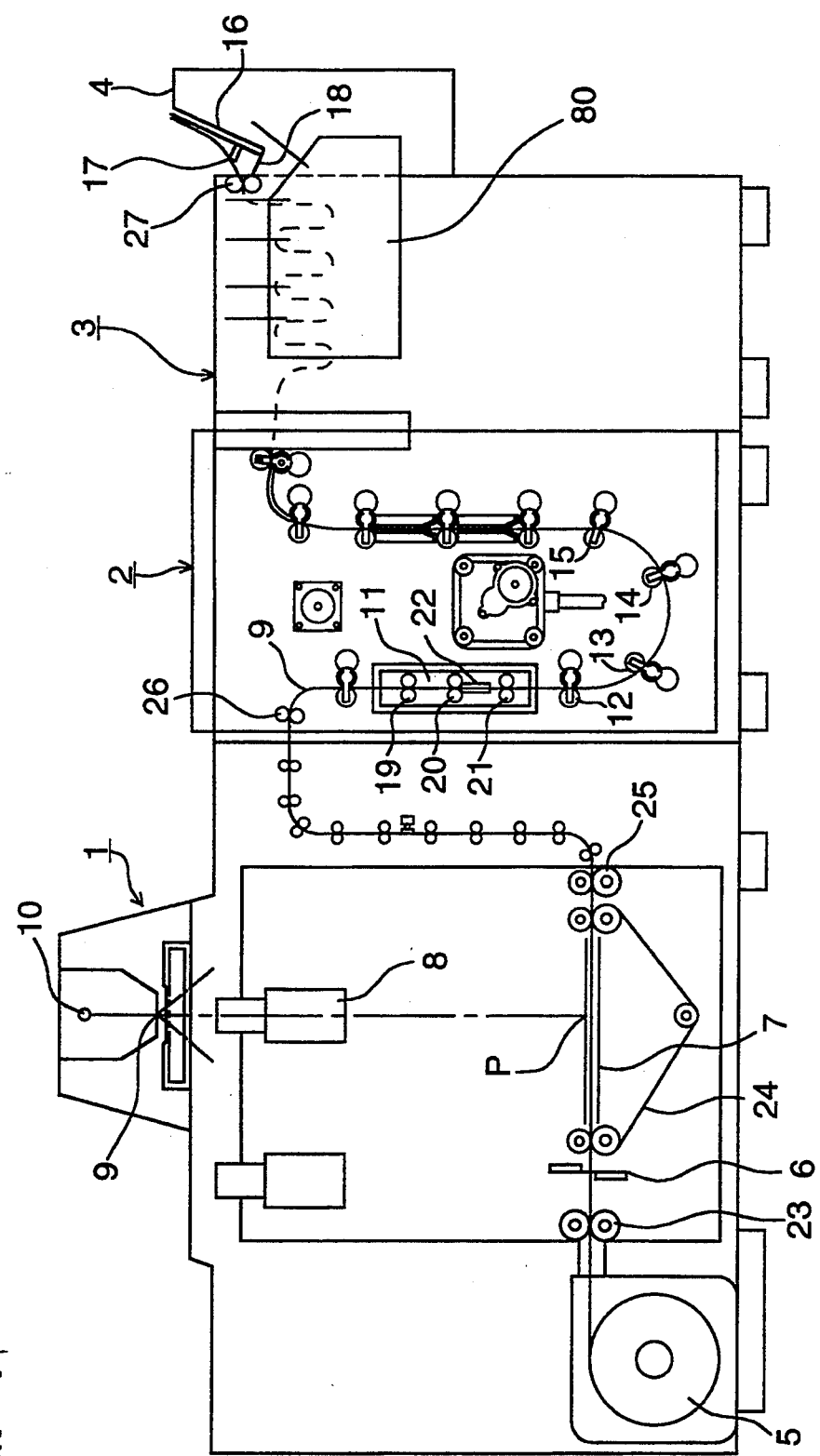
FIG. 1 is a view showing the entire structure of the photosensitive material processing device of the present invention.

FIG. 1 is a sectional view showing the entire structure of the photographic processing system of the example.

As shown in FIG. 1, a printing device 1, distribution device 2, automatic developing device 3 and accumulation means 4 are connected so that a series of operations can be carried out.

First, in the printing device 1, a negative film 9 is irradiated with light emitted from a light source 10, so that an image on the negative film 9 is formed by a projection lens 8 on a stationary photographic paper P conveyed on a platen 7. In this way, printing-exposure is carried out.

Prior to the printing-exposure operation, photographic paper P is sent out from a master roll magazine 5 in which the photographic paper is accommodated in the form of a long roll film. Then, photographic paper P is cut with a cutter 6 in accordance with a predetermined print size measured by a measuring means not shown. After that, photographic paper P is transferred by a conveyance means 24 and conveyed onto the center of the platen 7, and then stopped at the center.

After a predetermined printing-exposure operation has been conducted, photographic paper P is transferred to the next intermediate conveyance means 25, and conveyed to the right upper position in the drawing, and then received by a pair of entrance roller 26 of the distribution means 2. The conveyance speed of the entrance rollers 26 is the same as the processing speed of the printing device 1. Alternatively, the conveyance speed of the entrance rollers 26 may be the same as that of the intermediate conveyance means 25 operated at high speed.

Photographic paper P is conveyed to a distributing section 11 by the entrance rollers 26, and stopped being engaged with a guide 22. When the guide 22 is moved in a direction perpendicular to the surface of the drawing, photographic paper P engaged with the guide 22 is also moved to one side of a conveyance passage.

In this example, photographic papers P are distributed to two lines, however, the present invention is not limited to the specific example. Photographic papers P can be easily distributed to a plurality of lines by appropriately setting a stroke when photographic papers P are moved to one side. In this example, photographic papers P are distributed to two lines. After photographic paper P1 accommodated in the distributing section 11 in first has been moved to the side opposite to the viewer's side, the conveyance operation is started again. Then, photographic paper P1 is received by the next pair of rollers 12 and conveyed downward by the rotation of the rollers 12.

Pinching pressure of the next pairs of rollers 13 and 14 is set low, so that they are idly rotated when photographic paper P is pushed and inserted into the pairs of rollers. Therefore, photographic paper P1 is inserted into the pairs of rollers 13, 14 when the rollers 12 are rotated. After photographic paper P1 has passed through the pair of rollers 12, the conveyance of photographic paper stops.

In this example, photographic papers P are distributed to two lines, so that the rollers 13 and 14 are divided into two with respect to the direction perpendicular to the surface of FIG. 1. Each roller is not secured to the shaft but it is rotatably supported by the shaft. Accordingly, when a small size photographic paper is pushed into one of the roller lines, only the pair of rollers into which the photographic paper is pushed are rotated, and other pairs of rollers are not rotated.

Next, photographic paper P2 accommodated in the distributing section 11 in second is engaged with the guide 22 that has returned to the center, and moved to the viewer's side in FIG. 1. Then, photographic paper P2 is received by the next pair of rollers 12. When the rollers 12 are rotated, photographic paper P2 is conveyed downward. At this time, photographic paper P2 is inserted into the line of rollers 13 and 14 on the viewer's side in FIG. 1. Because the line of rollers on the viewer's side are separate from the line of rollers on the side opposite to the viewer's side that hold the first photographic paper P1, photographic paper P1 is not moved even when photographic paper P2 on the viewer's side is pushed and inserted into rollers. Photographic paper P2 on the viewer's side stops at a position where it has left the pair of rollers 12.

As described above, photographic papers P1 and P2 are distributed to two lines in one order. Since the size of photographic paper P1 and that of photographic paper P2 are the same, their conveyance operations are stopped at the same position where they have been just sent out from the rollers 12. As a result of the foregoing, not only the trailing edges of the photographic papers are aligned but also the leading edges are aligned.

After the photographic papers have been distributed to two lines in the manner described above, the pairs of rollers 13 and 14 start conveyance operations, and the two lines of photographic papers are simultaneously conveyed upward, and received by the automatic developing device 3.

The photographic paper that has been developed by the automatic developing device 3 is discharged by a discharge roller 27 onto a tray 16. After photographic paper P has been discharged onto the tray 16, a push rod 17 provided on the tray is moved in the direction perpendicular to the surface of the drawing by a push means not shown, that is, the push rod 17 is moved in the direction of the viewer's side in this example, and the pushed photographic papers are accumulated in an accumulating position provided on the viewer's side in FIG. 1.

In this example, the photographic papers are distributed to two lines. Therefore, photographic paper P2 on the viewer's side drops first, and then photographic paper P1 on the opposite side drops on photographic paper P2 so that photographic paper P1 is put on photographic paper P2. The aforementioned operations are successively repeated and the photographic papers of one order are stacked and collated on the accumulating section.

As described above, in this example, the pairs of rollers are divided into two lines in order to distribute the photographic papers, however, the pairs of rollers may be divided into a predetermined number of lines. Alternatively, the following method may be adopted: the pairs of rollers 13, 14 are not divided; the pairs of rollers 13, 14 are not pinched, that is, they are released; they are locked so that they can not be idly rotated; while a plurality of lines of photographic papers can be pushed onto the rollers in this manner, rollers composing each of the pairs of rollers 13, 14 are contacted with pressure at a time when the pushing operation has been completed; and the photographic paper is held by the rollers and conveyed. In order to simultaneously start the rotation of the rollers divided into a plurality of lines, the outer circumferences of the pairs of rollers 13, 14 are contacted with drive rollers rotated by one shaft.

The number of lines of photographic papers is judged and calculated in the following manner: the photographic paper processing width of the connected automatic developing device is wide in accordance with the large print size, and this width is inputted into a calculation control means as a specific size, the print size is determined in accordance with the photographic paper width in the magazine provided to the printing device so as to meet the order, and then the determined value is inputted into the calculation control means in order to calculate the number of lines. Photographic processing may be executed in accordance with the number of lines determined by the aforementioned calculation control without specifying the number of lines. Alternatively, the photographic processing may be executed in accordance with the number of lines selected by a selection means provided separately, wherein the selected number is not more than the value calculated in the above calculation. The reason is as follows: in order to stabilize the processing, it is advantageous that one order of printing operations are completed in a uniform number of lines while consideration is given to the number of one order. In this case, the stabilization of processing means the stabilization of development. The reason is as follows: when photographic papers are pushed to one side after development processing has been continued over the full photographic paper processing width, stainning is caused in a position where photographic papers were not contacted. Therefore, it is desirable that the photographic papers are distributed as uniformly as possible so as to complete one order of development. Since it is necessary to distribute the next order in a different way, it is possible to complete the distribution for each order or to reset.

Figure 2:
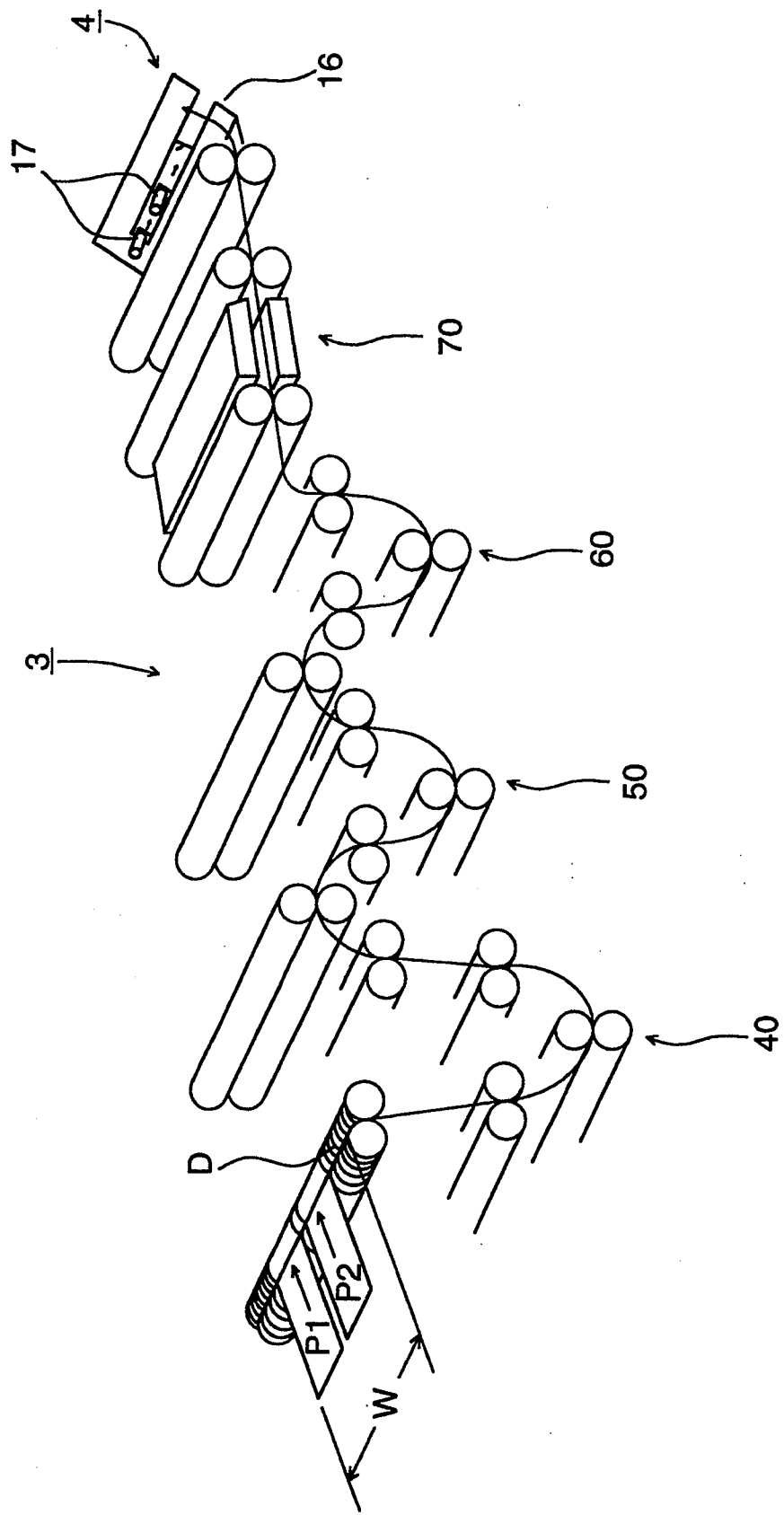
FIG. 2 is a perspective view showing the automatic developing device of the photosensitive material processing device in which multi-line of photographic papers are processed.

FIG. 2 is a schematic illustration showing a condition in which photographic papers distributed by the photographic distribution device are conveyed in the automatic developing device 3.

With reference to FIG. 2, an example will be explained, in which the conveyance line of photographic papers is successively changed with respect to all regions of the photographic paper conveyance rollers when the photographic papers are distributed to the lines, the number of which is predetermined. In FIG. 2, W is the processing width of the automatic developing device (the maximum width).

As shown in FIG. 2, first, photographic papers are distributed to two lines from a side opposite to the viewer. When a developing operation is continued under the aforementioned condition, a hatched portion D is stained. In order to prevent the occurrence of staining, the position of the conveyance line is successively changed to the viewer's side. In this way, the occurrence of staining in a particular portion can be prevented.

An outline of the operation of the automatic developing device 3 shown in FIG. 2 will be explained as follows. First, photographic papers are distributed to two lines by the distribution device provided upstream of the automatic developing device 3 so that the photographic papers P are distributed to the side opposite to the viewer and the viewer's side. Photographic papers P are transferred to the roller conveyance means of the developing tank 30 and developed, which is the first processing tank of the automatic developing device 3. Then, the photographic papers pass through the bleaching and fixing tank 40 and the washing or stabilization processing tank 50. After that, they are dried in the drying section 60 and discharged onto the tray 16 as a print. The discharged prints are pushed to the viewer's side by the push rod 17 of the pushing means that is in a waiting condition. In this way, the prints are accumulated on the viewer's side.

It is preferable that the conveyance line is successively changed for each order from the viewpoint of system constitution, however, the present invention is not limited to the aforementioned structure.

Figure 3:
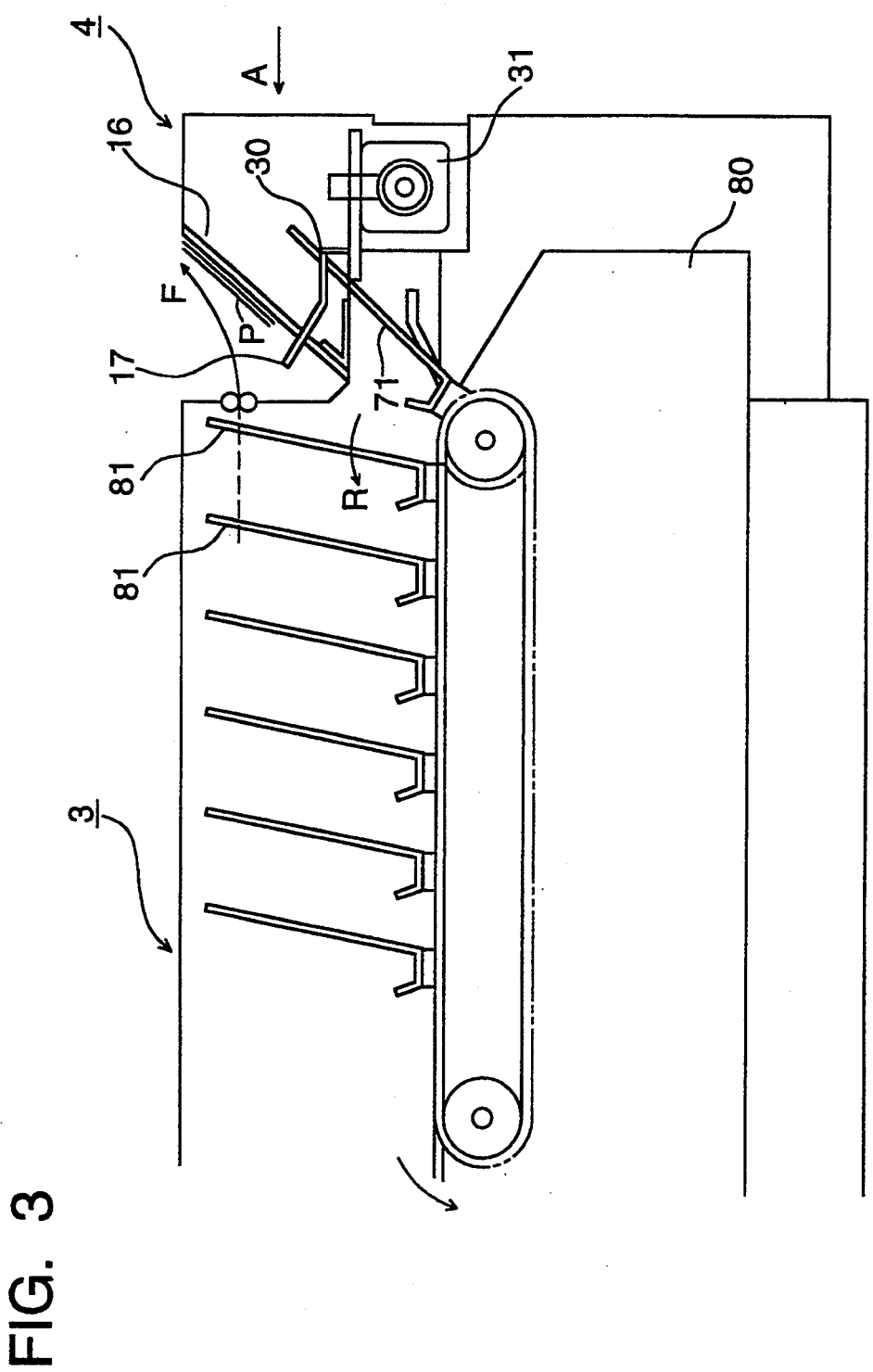
FIG. 3 is a sectional view showing a sorter and an accumulation means.
Figure 4:
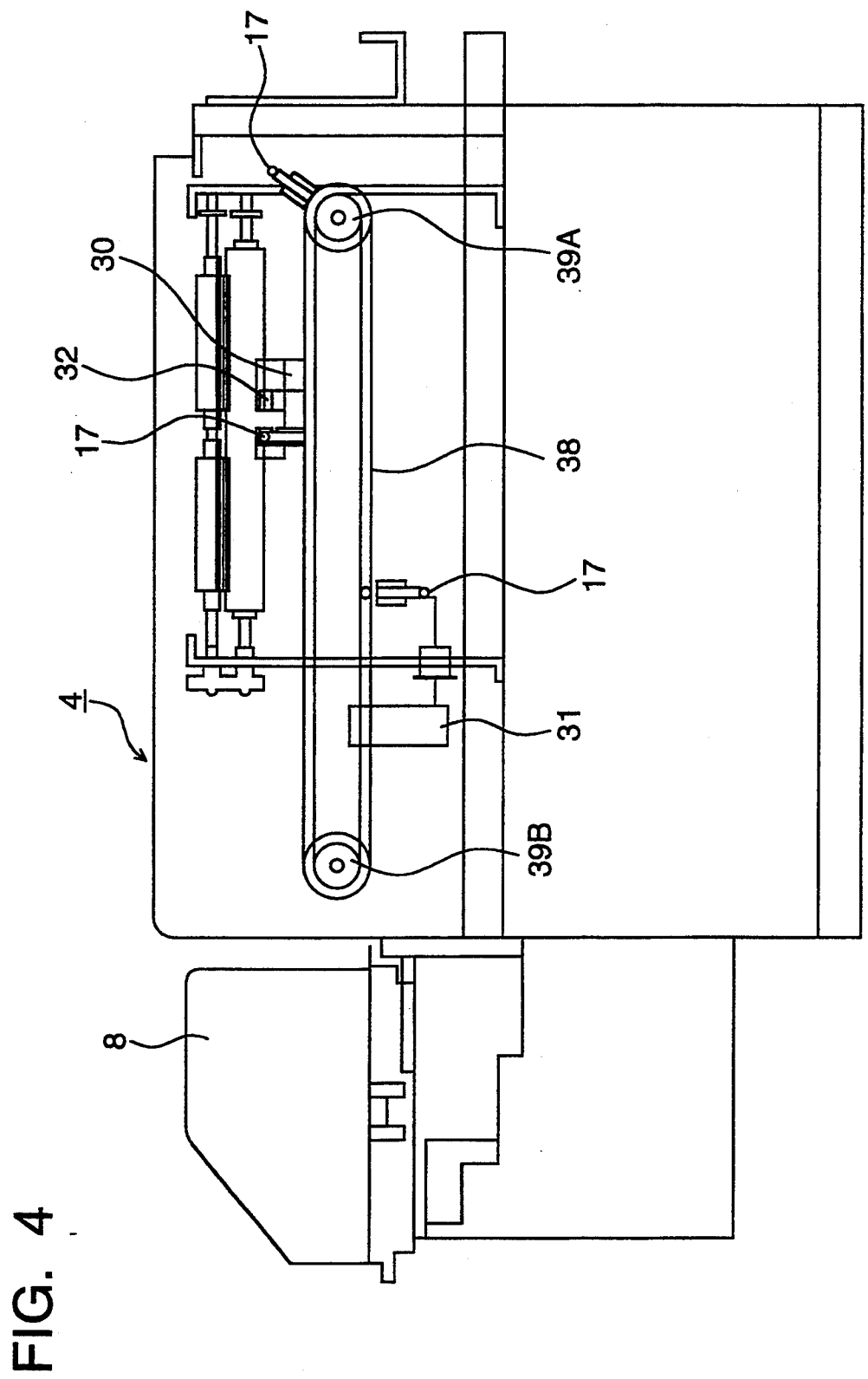
FIG. 4 is sectional view of the accumulation means and the sorter taken in the direction of arrow A in FIG. 3.

FIG. 3 is a sectional view for explaining the details of the accumulation means 4, print conveyance means, and adjoining sorter portion 80. FIG. 4 is a sectional view taken in the direction of arrow A in FIG. 3.

In FIGS. 3 and 4, the print push member 17 is a rod-shaped member movably engaged with the chain belt 38 by the engaging section 30. The print push member 17 protrudes onto the tray 16 through a slit-shaped opening provided under the tray 16.

The chain belt 38 is provided between the wheels 39A and 39B, and the wheel 39B is driven by the motor 31. In this example in which the photographic papers are distributed to two lines, the engaging section 30 is composed in the following manner: the engaging section 30 includes a base with which a movable member to change the interval between two print push members 17 is engaged; and the base is engaged with the chain belt 38. The interval between two print push members 17 is controlled by the control means in accordance with the detection result of the detection means 32. Numeral 81 represents a plurality of movable bins of the sorter 80.

Since the photographic processing system of the present invention is composed in the aforementioned manner, the processing capacity of the photographic paper automatic developing device, the processing speed of which is lower than that of the printing device, can be multiplied by the number of lines of distributed photographic papers. Moreover, the prints can be easily sorted for each order. Therefore, it is possible to meet the demands of customers.

According to the present invention, photographic papers are distributed to a plurality of lines so as to be subjected to multi-line-processing. Therefore, the automatic developing device can be effectively used, so that the processing capacity can be increased. Moreover, a particular portion of the device is not stained. Accordingly, it is possible to stably maintain the processing capacity of the device.

According to the present invention, the waiting positions of the print push members are changed in accordance with the number of lines of photographic papers discharged from the automatic developing device, so that the loss of time caused when the push members are moved can be eliminated. Moreover, a collated set of photographic prints for each order can be accumulated in the sorter section, so that the working efficiency of the photosensitive material processing device can be remarkably improved.

What is claimed is:

1. An apparatus for processing a photographic paper, comprising:

means for exposing a cut sheet of photographic paper with an image light at an exposing region so as to form a latent image, the exposing means including an exposure conveyance member to convey a cut sheet of photographic paper along an exposure conveyance line on the exposing region;

means for developing the exposed photographic paper in a developing region so as to visualize the latent image, the developing means including a developing conveyance member having a developing conveyance width larger than the width of a photographic paper so that the developing conveyance member can convey plural sheets of exposed photographic papers in parallel in the developing region;

means for distributing the exposed photographic papers conveyed along the exposure conveyance line in the exposing means into plural parallel development conveyance lines in the developing means in accordance with the width of a photographic paper and means for aligning the leading edges of the plural distributed photographic papers.

2. The apparatus of claim 1, further comprising means for shifting the developed photographic papers along a discharging line to a collecting position.

3. The apparatus of claim 2, wherein the shifting means comprises plural pushing members moving along the discharging line, and wherein the distance between the plural pushing members and a stop position of each of the plural pushing members are changed in accordance with a number of the parallel development conveyance lines.

4. The apparatus of claim 2, wherein the shifting means conducts a shifting operation for each order of a customer.

5. The apparatus of claim 4, further comprising sorting means for collecting the shifted photographic papers from the collecting position for each order of a customer.

6. The apparatus of claim 1, further comprising control means for calculating the number of the parallel development conveyance lines on the basis of a relation between the width of photographic papers and the developing conveyance width and for controlling the distributing means in accordance with the calculation result.

7. The apparatus of claim 6, wherein the control means changes the position of the parallel development conveyance lines.

8. The apparatus of claim 6, wherein the control means conducts the calculation for each order of a customer.

9. The apparatus of claim 1, further comprising means for cutting a roll of photographic photographic paper into a sheet of photographic paper in accordance with a printing size.

* * * * *